(12) United States Patent
Tam

(10) Patent No.: US 10,613,736 B2
(45) Date of Patent: Apr. 7, 2020

(54) DRAG AND DROP UPDATING OF OBJECT ATTRIBUTE VALUES

(71) Applicant: SugarCRM Inc., Cupertino, CA (US)

(72) Inventor: David Tam, Sunnyvale, CA (US)

(73) Assignee: SUGARCRM INC., Cupertino, CA (US)

(*) Notice: Subject to any disclaimer, the term of this patent is extended or adjusted under 35 U.S.C. 154(b) by 1625 days.

(21) Appl. No.: 13/844,462

(22) Filed: Mar. 15, 2013

(65) Prior Publication Data
US 2014/0282164 A1    Sep. 18, 2014

(51) Int. Cl.
*G06F 3/0486* (2013.01)
*G06F 3/0484* (2013.01)

(52) U.S. Cl.
CPC ........ *G06F 3/0486* (2013.01); *G06F 3/04847* (2013.01)

(58) Field of Classification Search
CPC combination set(s) only.
See application file for complete search history.

(56) References Cited

U.S. PATENT DOCUMENTS

| | | | |
|---|---|---|---|
| 2007/0067295 A1* | 3/2007 | Parulski | G06F 17/30265 |
| 2007/0234227 A1* | 10/2007 | Prinsen et al. | 715/769 |
| 2010/0077333 A1* | 3/2010 | Yang | G06F 3/0486 |
| | | | 715/769 |
| 2012/0185800 A1* | 7/2012 | Hart | G06F 3/04817 |
| | | | 715/810 |

OTHER PUBLICATIONS

Barney and McLaughlin, Oracle Database AJAX & PHP Web Application Development, Feb. 21, 2008, McGraw-Hill, Chapters 1.1 (Scalability), 1.2 (Reducing CPU Cycles and RAM Size), 2.1 (Modularity), 3.5 (Javascript Attributes and Methods), and 6.2.1 (The Drag-and-Drop Library), http://techbus.safaribooksonline.com/book/web-development/ajax/9780071502771.*

Sauer, Drag-and-Drop for your Google Web Toolkit Projects, Jun. 29, 2011, Webpage, ResizeDragController.java and WindowPanel.java, https://gwt-dnd.appspot.com/#WindowExample.*

* cited by examiner

*Primary Examiner* — William L Bashore
*Assistant Examiner* — Daniel W Parcher
(74) *Attorney, Agent, or Firm* — Steven M. Greenberg, Esq.; Shutts & Bowen LLP

(57) ABSTRACT

Embodiments of the invention provide a method, system and computer program product for drag and drop manipulation of object attribute values. In an embodiment of the invention, a method for drag and drop manipulation of object attribute values is provided. The method includes detecting a drop event for an object in a GUI of an application executing in memory of a computer. The method additionally includes identifying a region of the GUI into which the object is dropped and retrieving a value associated with the identified region, that is additionally associated with an attribute of the object. Finally, the method includes setting the attribute of the object with the retrieved value.

3 Claims, 2 Drawing Sheets

DRAG AND DROP UPDATING OF OBJECT ATTRIBUTE VALUES

BACKGROUND OF THE INVENTION

Field of the Invention

The present invention relates to object data manipulation and more particularly to graphical user interface access to object data.

Description of the Related Art

In a computer graphical user interfaces (GUI), drag and drop refers to a pointing device gesture in which an end user selects a virtual object by "grabbing" the object in one portion of a GUI and dragging the object to a different location of the GUI or onto another virtual object. In general, dragging-and-dropping can be used to invoke many sorts of actions, or create various types of associations between two abstract objects. A very common use of dragging and dropping is to direct a file copy or file move operation.

The virtual objects in of themselves oftentimes are iconic representations of objectified data structures that include one or more method members and data members. In this regard, a method member is a function or logical operation defined for use within the object. A data member, in turn, is an attribute of the object that can be assigned a value to be encapsulated by the object. Properly defined, an object with a data member defines a companion "getter-setter" pair of method members that include logic for establishing a value for the data member and retrieves the stored value of the data member.

Predominately, a value is established for a data member through the programmatic invocation of a corresponding method member. However, drag and drop techniques have been developed in which the value of a data member of a target object is established by dragging and dropping a different object onto the target object.

BRIEF SUMMARY OF THE INVENTION

Embodiments of the present invention address deficiencies of the art in respect to object attribute value manipulation and provide a novel and non-obvious method, system and computer program product for drag and drop manipulation of object attribute values. In an embodiment of the invention, a method for drag and drop manipulation of object attribute values is provided. The method includes detecting a drop event for an object in a GUI of an application executing in memory of a computer. The method additionally includes identifying a region of the GUI into which the object is dropped and retrieving a value associated with the identified region, that is additionally associated with an attribute of the object. Finally, the method includes setting the attribute of the object with the retrieved value. In one aspect of the embodiment, the method also includes selecting an attribute for a set of objects of the application and determining a value for the attribute for each of the objects. Thereafter, each one of the objects can be positioned in a region of the GUI associated with a value of the attribute for the one of the objects.

In another embodiment of the invention, a computer data processing system can be configured for drag and drop manipulation of object attribute values. The system can include a host computer system that includes memory and at least one processor, an application executing in the memory of the host computer system that also includes different objects, and a graphical user interface displayed for the application in the host computer system. The system also can include a drag and drop module coupled to the application. The module can include program code enabled to detect a drop event in the GUI for an object amongst the objects, to identify a region of the GUI into which the object is dropped, to retrieve a value associated with the identified region, the value being additionally associated with an attribute of the object, and to set the attribute of the object with the retrieved value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for drag and drop manipulation of object data. In accordance with an embodiment of the invention, different objects can be organized in a graphical user interface (GUI) of an application according to a value of an attribute of the object. Each object can be subjected to a drag and drop operation by way of the removal of the object from one portion of the GUI associated with a contemporaneous value of the attribute of the object to another portion of the GUI associated with a different value of the attribute. In response to the foregoing drag and drop operation, the contemporaneous value of the attribute of the object can be updated to the different value. In this way, attribute values of objects can be manipulated through the dragging-and-dropping of the objects from one portion of the GUI to another.

Figure 1:
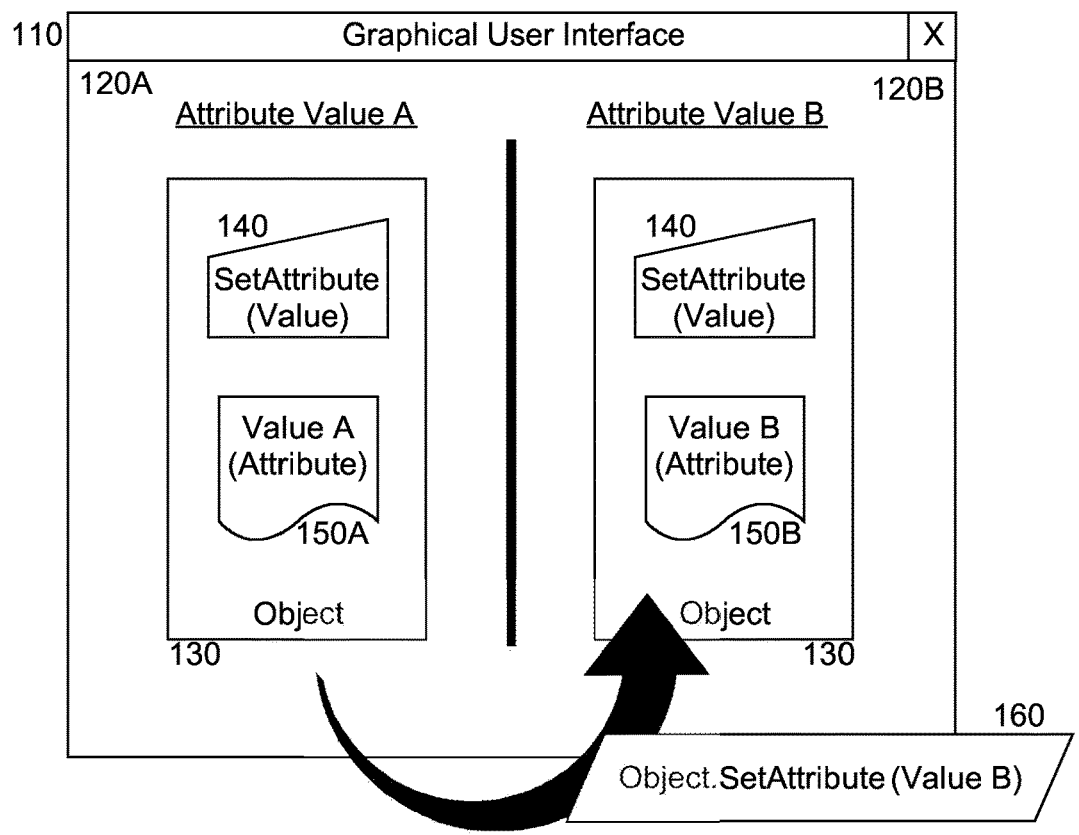
FIG. 1 is a pictorial illustration of a process for drag and drop manipulation of object attribute values.

In further illustration, FIG. 1 pictorially shows a process for drag and drop manipulation of object attribute values. As shown in FIG. 1, a GUI 110 can be provided in which an object 130 is displayed. The object 130 can include a data member with an assigned value 150A, 150B. The object 130 further can include a corresponding method member 140 configured to update the data member with an assigned value 150A, 150B. Of note, the GUI 110 can include different display regions 120A, 120B. Each region corresponds to one of the values 150A, 150B.

Importantly, the GUI 110 can be configured to respond to a drag and drop event for the object 130 by identifying the display region 120B into which the object 130 is dropped and a corresponding value 150B for the display region 120B. Thereafter, the GUI 110 can direct an operation 160 for the method member 140 of the object 130 to update the data member of the object 130 with the corresponding value 150B of the display region 120B. In this way, the data member of the object 130 can be updated with the corresponding value 150B with a single drag and drop operation.

Figure 2:
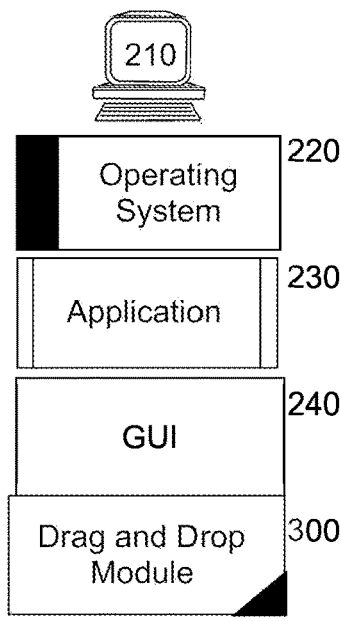
FIG. 2 is a schematic illustration of a computer data processing system configured for drag and drop manipulation of object attribute values; and, FIG. 3 is a flow chart illustrating a process for drag and drop manipulation of object attribute values.

The process described in connection with FIG. 1 can be implemented within a computer data processing system. In yet further illustration, FIG. 2 schematically shows a computer data processing system configured for drag and drop manipulation of object attribute values. The system can include a host computing system 210 with at least one processor and memory. The host computing system 210 can include an operating system 220 executing in the memory and supporting the operation of an application 230. The application 230 in turn can provide a GUI 240 through which an end user can interact with the application 230.

A drag and drop module 300 can be coupled to the application 230 and the GUI 240. The drag and drop module 300 can include program code enabled upon execution in the memory of the host computing system 210 to respond to a drag and drop event for an object in the GUI 240 by identifying a region of the GUI 240 in which the object has been dropped. A value for an attribute of the object that is associated with the identified region can be determined by the program code of the module 300 and the program code of the module 300 can invoke a method member of the object to set the attribute of the object with the value. In this way, attribute values of an object can be manipulated through drag and drop operations.

Figure 3:
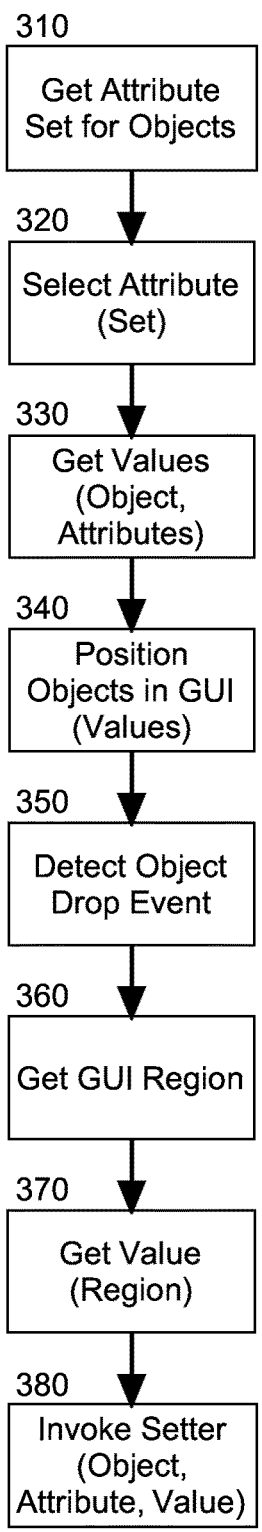

In even yet further illustration of the operation of the drag and drop module 300, FIG. 3 is a flow chart illustrating a process for drag and drop manipulation of object attribute values. Beginning in block 310, an attribute set for objects of an application can be loaded and in block 320, a particular one of the attributes can be selected. In block 330, the value of the particular one of the attributes for each of the objects can be determined and in block 340, each of the objects can be placed in a specific region of a GUI of the application according to a value of the particular one of the attributes encapsulated within the object.

In block 350, a drag and drop event can be detected for the object. Thereafter, in response in block 360 a region of the GUI into which the object is dropped can be identified and a value for the particular one of the attributes associated with the region can be retrieved in block 370. Finally, in block 380 a method member of the object can be invoked to set a value of the particular one of the attributes of the object with the value retrieved for the region of the GUI into which the object had been dropped.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for drag and drop manipulation of object attribute values, the method comprising:
    loading an attribute set for objects of an application;
    selecting a particular one of the attributes;
    determining a value for the particular one of the attributes for each of the objects of the application;
    positioning each one of the objects in a region of a graphical user interface (GUI) associated with a corresponding determined value;
    detecting a drop event for an object in the; and,
    responding to the drag and drop event by identifying a display region of the GUI into which the object is dropped and a corresponding value for the identified display region; and, invoking a method member of the object to set the attribute of the object with the corresponding value.

2. A computer data processing system configured for drag and drop manipulation of object attribute values, the system comprising:
    a host computer system comprising memory and at least one processor;
    an application executing in the memory of the host computer system and comprising a plurality of objects;
    a graphical user interface (GUI) displayed for the application in the host computer system; and,
    a drag and drop module coupled to the application, the module comprising program code enabled to load an attribute set for objects of an application, select a particular one of the attributes, to determine a value for the particular one of the attributes for each of the objects of the application, to position each one of the objects in a region of the GUI associated with a corresponding determined value, to detect a drop event in the GUI for an object amongst the objects, and to respond to the drag and drop event by identifying a display region of the GUI into which the object is dropped and a corresponding value for the identified display region and, to invoke a method member of the object to set the attribute of the object with the corresponding value.

3. A computer program product for drag and drop manipulation of object attribute values, the computer program product comprising:
    a computer readable storage memory device storing computer readable program code thereon, the computer readable program code comprising:
    computer readable program code for loading an attribute set for objects of an application;
    computer readable program code for selecting a particular one of the attributes;
    computer readable program code for determining a value for the particular one of the attributes for each of the objects of the application;
    computer readable program code for positioning each one of the objects in a region of a graphical user interface (GUI) associated with a corresponding determined value;
    computer readable program code for detecting a drop event for an object in the; and, computer readable program code for responding to the drag and drop event by identifying a display region of the GUI into which the object is dropped and a corresponding value for the identified display region and, invoking a method member of the object to set the attribute of the object with the corresponding value.

\* \* \* \* \*